United States Patent [19]
Denslow et al.

[11] 3,833,163
[45] Sept. 3, 1974

[54] ULTRASONIC APPARATUS
[75] Inventors: Clark A. Denslow, Wilton; Edward G. Obeda, Brookfield, both of Conn.
[73] Assignee: Branson Instruments, Incorporated, Stamford, Conn.
[22] Filed: Mar. 8, 1973
[21] Appl. No.: 339,083

[52] U.S. Cl.................... 228/1, 118/400, 118/429, 228/36
[51] Int. Cl............................................ B23k 1/06
[58] Field of Search............ 228/1, 36, 37; 118/259, 118/400, 429; 310/26; 259/DIG. 44

[56] References Cited
UNITED STATES PATENTS
3,249,281  5/1966  St. Jean .............................. 228/1 X
3,752,381  8/1973  Watson, Jr. ............................. 228/1
3,762,368  10/1973  Strube et al. ....................... 118/429

Primary Examiner—J. Spencer Overholser
Assistant Examiner—Robert J. Craig
Attorney, Agent, or Firm—Ervin B. Steinberg

[57] ABSTRACT

An ultrasonic soldering tank is provided with a plurality of electroacoustic transducer assemblies, each assembly comprising a stacked arrangement of juxtaposed piezoelectric disks, a plate of high thermal conductivity material for acting as a hear sink and a coupling bar of low thermal conductivity material. The coupling bar while transmitting acoustic energy from the piezoelectric disks to the tank also provides thermal insulation between the hot tank and the heat sensitive piezoelectric material.

3 Claims, 2 Drawing Figures

PATENTED SEP 3 1974  3,833,163

ULTRASONIC APPARATUS

BACKGROUND OF THE INVENTION

This invention concerns an ultrasonic apparatus and more specifically has reference to an apparatus of the type in which a body of liquid is maintained at an elevated temperature while being subjected to sonic or ultrasonic energy. Exemplary of such an embodiment is an ultrasonic soldering apparatus comprising a pool of liquid solder which is maintained at a temperature above 400°C while being subjected to ultrasonic energy produced by electroacoustic transducers coupled to the outside surface of a metal tank supporting the pool.

The benefits derived from ultrasonic energy in conjunction with a liquid solder bath have been described in the prior art, see for instance U.S. Pat. No. 2,397,400, H. Barwich, dated Mar. 26, 1946, and U.S. Pat. No. 3,385,262, S. E. Jacke et al, dated May 28, 1968.

As is known from the prior art, solder joints on aluminum can be made most effectively by means of an ultrasonically activated solder bath. The ultrasonic energy displaces the tenacious oxide layer normally present at the aluminum surface and causes a clean oxide-free surface to which the solder adheres for providing a sound metallurgical bond. The bond is formed without the use of flux which in many instances is objectionable.

The above described process has received renewed attention in connection with the desire of producing tubular cooling coils, heat exchangers, radiators and the like made of aluminum metal rather than copper. Not only is aluminum less expensive than copper, but it is also lighter. Additionally, the raw material for producing aluminum, i.e. bauxite, is more plentiful and more evenly distributed than copper ore.

One of the processes for producing heat exchangers comprises the steps of mechanically assembling the parts constituting the heat exchanger, preheating the joints to be soldered by a gas flame or radiant energy and then dipping the exchanger with its joints briefly into the solder bath which is activated with ultrasonic energy. The ultrasonically activated solder bath effects at the surface to be united a sound and hermetically tight joint without flux.

It will be apparent that tanks for accommodating radiators are relatively large in size and must operate substantially on a continuous basis if radiators and heat exchangers are to be fabricated in mass production.

The attachment of the electroacoustic transducers to the tank surface presents several unique problems. Principally, the tank is hot in order that the solder is in its liquid state. However, the active transducer material, i.e. piezoelectric material of the electrostrictive transducers, must be maintained at a sufficiently low temperature to prevent depolarization or loss of efficiency even before actual depolarization occurs. The depolarization temperature for the universally recognized highly efficient lead zirconate titanate (PZT) material is in the range from 320° to 365°C. Additionally, the transducers must be removably coupled to the solder tank surface to permit repair and/or replacement in the event of failure of one or more of the transducers, parts thereof, or of the tank itself. Last, but not least, the transducers must be coupled to the tank surface in a manner to provide for the transmission of ultrasonic energy.

It is a principal object of this invention, therefore, to provide an improved ultrasonic transducer construction particularly useful for use in conjunction with a tank containing a liquid which is maintained at an elevated temperature.

A further important object of this invention is the provision of a piezoelectric ultrasonic transducer assembly for use with a liquid solder tank.

A still further object of this invention is the provision of an ultrasonic transducer construction and the attachment of such a transducer assembly to a tank containing liquid solder for the purpose of providing and transmitting ultrasonic energy produced by the transducer assembly through a wall of the tank to the liquid solder.

Further and still other objects of this invention will become more clearly apparent from the following description when taken in conjunction with the accompanying drawing.

DETAILED DESCRIPTION OF THE PREFERRED EMBODIMENT

Figure 1:
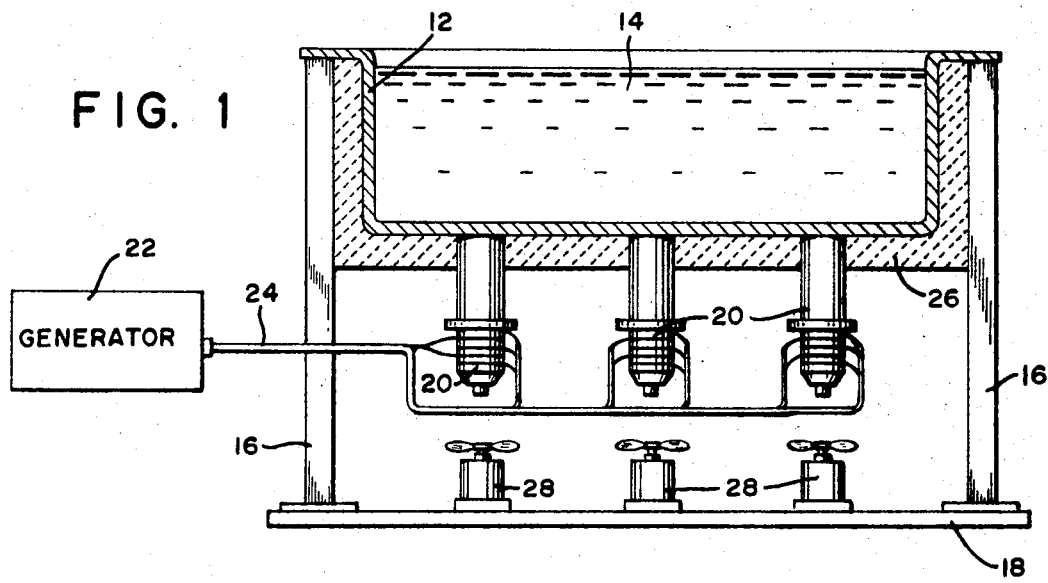
FIG. 1 is a schematic illustration of an ultrasonic soldering tank.

Referring now to the figures and FIG. 1 in particular, numeral 12 identifies a metal tank adapted to hold a liquid 14, such as molten solder. The tank is supported by a suitable structure including legs 16 resting on a plate 18 and engaging the tank 12 at its flanged portion. A plurality of electroacoustic transducer assemblies 20 are mounted to the underside of the tank surface as will be described in greater detail hereafter. An electrical generator 22 provides electrical high frequency energy at a suitable frequency, typically in the range from 10 to 60 kHz, via a conductor 24 to the transducer assemblies 20 which responsive to such energization produce acoustic energy in the sonic or ultrasonic frequency range. This energy is transmitted via the tank wall into the liquid. The tank 12 is surrounded by thermal insulating material 26 for diminishing the heat loss from the liquid which, in a typical example, may be at a temperature of 430°C. For the sake of simplicity the heating means and thermostatic control means adapted to bring the liquid 14 to the desired temperature and maintain it at such temperature have been omitted from the drawing. One or more fans 28 mounted to the plate 18 are disposed to provide forced air cooling for the transducer assemblies 20.

Figure 2:
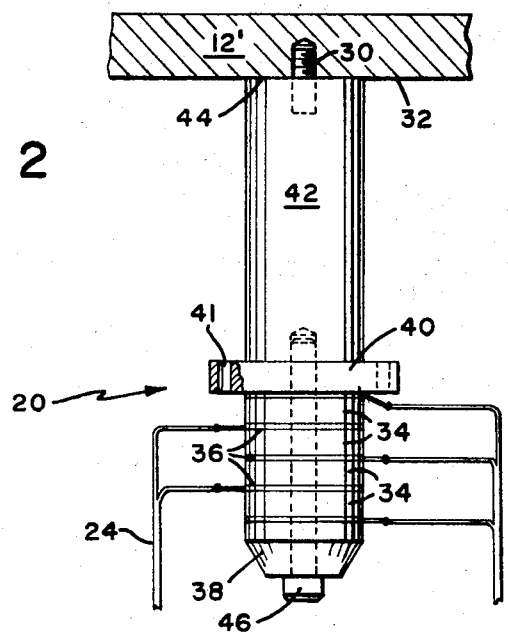
FIG. 2 is a side view of a transducer assembly and its attachment to the bottom surface of the tank in accordance with a preferred embodiment of this invention.

A preferred construction of the individual transducer assemblies will be more clearly apparent by reference to FIG. 2 in which numeral 12' indicates a cross-sectional portion of the tank bottom. A relatively short threaded stud 30 is threaded into the tank bottom and extends partially from the surface 32 of the tank bottom. The transducer assembly comprises a plurality of juxtaposed disks 34 made of piezoelectric material, such as lead zirconate titanate. Interposed metal electrodes 36 provide high frequency and ground electrical circuit connection between the conductor 24 and the piezoelectric disks 34.

The transducer assembly includes, moreover, a metallic back driver 38 on one side of the juxtaposed disks, and a metallic plate 40 of high thermal conductivity, and a coupling bar 42 made of relatively low thermal conductivity on the other side of the disks. The free or frontal end of the coupling bar is threadedly engaged by the stud 30 in such a manner as to cause the frontal surface 44 of the coupling bar to be in abutting contact with the tank surface 32 to provide for the transmission of acoustic energy from the transducer assembly to the tank wall and to the liquid confined in the tank 12. The back driver 38, piezoelectric disks 34, metallic plate 40 and coupling bar 42 are coupled to each other by a threaded bolt 46 which causes the piezoelectric disks to be under a static compressional force as is well known in the art and has been described for instance in U.S. Pat. No. 3,524,085 issued to A. Shoh, on Aug. 11, 1970, entitled "Sonic Transducer." The individual parts forming the transducer assembly are dimensioned, taking into consideration their material and configuration, to form at a predetermined frequency a half wavelength resonator, or an integer multiple thereof, of the frequency of sound travelling longitudinally therethrough. The dimensioning of the stacked transducer construction is well known in the art and is described, for instance, in Ultrasonic Engineering (book) by Julian R. Frederick, John Wiley & Sons, Inc., New York, N. Y. (1965) pages 67 to 74.

The present invention concerns primarily the arrangement of a plate of relatively high thermal conductivity and a coupling bar 42 of relatively low thermal conductivity in the transducer assembly. The plate 40 is of slightly larger diameter than the piezoelectric disks and is preferably made from aluminum material. In addition, the plate 40 is provided with peripheral serrations or apertures 41 in order to increase the heat dissipating surface available. The plate acts as a heat sink for the heat dissipated by the piezoelectric disks 34 and such heat transfer is enhanced by the forced air cooling provided by the fans 28, FIG. 1. A heat sink of this type has been disclosed also in U.S. Pat. No. 3,328,610, dated June 27, 1967 issued to S. E. Jacke and assigned to the assignee of this application. It is, moreover, extremely important and necessary to thermally insulate the piezoelectric disks from the elevated temperature of the tank and the liquid therein, since, as has been stated, the Curie temperature of the piezoelectric material is slightly above 300°C and a loss of efficiency is manifest already at a lower temperature as the Curie temperature is approached. The thermal insulation is achieved by the provision of a coupling bar 42 which is fabricated preferably from titanium material. To illustrate this thermal insulating feature more specifically, the following values may be considered: Aluminum type 2024 has a thermal conductivity at or near room temperature of 0.45 Cal/cm²/cm/°C/sec., whereas average commercial grade titanium metal has a thermal conductivity of only 0.03 Cal/cm²/cm/°C/sec., hence providing a ratio of 15 to 1. Titanium forms therefore a most effective thermal insulating material while exhibiting still excellent properties for transmitting sonic energy, see Frederick supra.

Actual tests have revealed that the titanium coupling bar constitutes a most effective heat barrier, whereas the aluminum plate acts simultaneously as a very effective heat sink for removing the heat generated by the piezoelectric material.

In addition, it should be observed that the steel bolt 46 and the threaded steel stud 30 are separate parts, widely separated, in order to prevent the conduction of heat from the tank to the piezoelectric material which would occur if but a single steel bolt were used for clamping the piezoelectric disks and coupling the transducer assembly to the hot tank surface. Such a simplified construction would be possible, of course, if merely a mechanical coupling of the parts and attachment thereof to the tank were desired.

One obvious modification comprises the placing of the metallic plate 40 on the other side of the piezoelectric disks 34 and, if suitably dimensioned, it may be combined with the back driver 38. However, for achieving higher mechanical vibrational amplitude it is generally desired to employ a high density metal as back driver 38 and a lower density metal for the front coupling bar 42.

It will be apparent that the construction disclosed heretofore is well suited to provide high intensity vibrational energy to a hot liquid, such as molten metal, while providing thermal protection for the electroacoustic transducer material, in the present example for the heat sensitive piezoelectric disks used for converting applied electrical high frequency to mechanical vibration.

What is claimed is:

1. An ultrasonic soldering apparatus comprising:
   A. a tank;
   B. at least one electroacoustic transducer assembly coupled to an outer surface of said tank; each transducer assembly including:
      B1. piezoelectric means;
      B2. electrical circuit connecting means coupled to said piezoelectric means for energizing said piezoelectric means with alternating current energy;
      B3. a metallic plate of relatively high thermal conductivity mechanically and thermally coupled to said piezoelectric means for acting as a heat sink for the heat dissipated by said piezoelectric means;
      B4. a metallic coupling bar of relatively low thermal conductivity disposed to form a thermal barrier between said piezoelectric means and the surface of a tank to which said transducer assembly is coupled;
      B5. threaded fastening means disposed for coupling said piezoelectric means and said plate to one end of said coupling bar and causing said piezoelectric means to be subjected to a compressive force;
      B6. said piezoelectric means, plate and coupling bar being dimensioned taking into account the respective materials and their geometry to form a unified half wavelength resonator at a predetermined frequency of sound travelling axially through said assembly when said electrical connecting means is energized with alternating current energy of said frequency, and
   C. further fastening means disposed for securing the other end of said coupling bar into acoustic energy transmitting relation with said tank surface.

2. An ultrasonic soldering apparatus as set forth in claim 1, said metallic plate being made of aluminum and said coupling bar being made of titanium metal, and said plate being interposed between said piezoelectric means and said one end of said coupling bar.

3. An ultrasonic soldering apparatus as set forth in claim 2, each of said fastening means threadedly engaging said coupling bar, and said bar providing thermal isolation along the distance between the ends of said fastening means.

* * * * *